United States Patent [19]

Herr

[11] Patent Number: 5,790,243

[45] Date of Patent: *Aug. 4, 1998

[54] HIGHWAY PROFILE MEASURING SYSTEM

[76] Inventor: William F. Herr, 2353 Terrazo Salvo, Carlsbad, Calif. 92009

[*] Notice: The term of this patent shall not extend beyond the expiration date of Pat. No. 5,510,889.

[21] Appl. No.: 639,897

[22] Filed: Apr. 22, 1996

Related U.S. Application Data

[63] Continuation-in-part of Ser. No. 130,099, Sep. 30, 1993, Pat. No. 5,510,889.
[51] Int. Cl.[6] .......................... E01C 23/00; G01B 11/24; G01C 3/08; G01P 3/36
[52] U.S. Cl. .......................... 356/5.1; 73/146; 356/2; 356/3.01; 356/376; 356/28
[58] Field of Search .................... 356/5.1, 2, 3.01, 356/28, 376; 73/146

[56] References Cited

U.S. PATENT DOCUMENTS

| | | |
|---|---|---|
| 3,705,772 | 12/1972 | Andreas . |
| 4,179,216 | 12/1979 | Theurer et al. . |
| 4,473,960 | 10/1984 | Pace et al. ................... 33/366 |
| 4,490,038 | 12/1984 | Theurer et al. . |
| 4,569,078 | 2/1986 | Zuk . |
| 4,571,695 | 2/1986 | Elton et al. ................... 33/551 |
| 4,627,734 | 12/1986 | Rioux . |
| 4,741,207 | 5/1988 | Spangler ................... 73/146 |
| 4,781,058 | 11/1988 | Soma et al. ................... 356/376 |
| 5,006,721 | 4/1991 | Cameron et al. . |

*Primary Examiner*—Stephen C. Buczinski
*Attorney, Agent, or Firm*—John R. Ross

[57] ABSTRACT

A system for measuring the quality of pavement surfaces. An amplitude modulated laser scanning system, mounted on a motor vehicle, scans the pavement surface as the motor vehicle travels over it. A detector detects the laser beam reflection from the surface and a phase measuring device counts pulses to digitally determine the phase shift in the reflected laser beam in order to calculate the profile of the surface. The profile information is used to determine various quality features of the pavement surface.

12 Claims, 5 Drawing Sheets

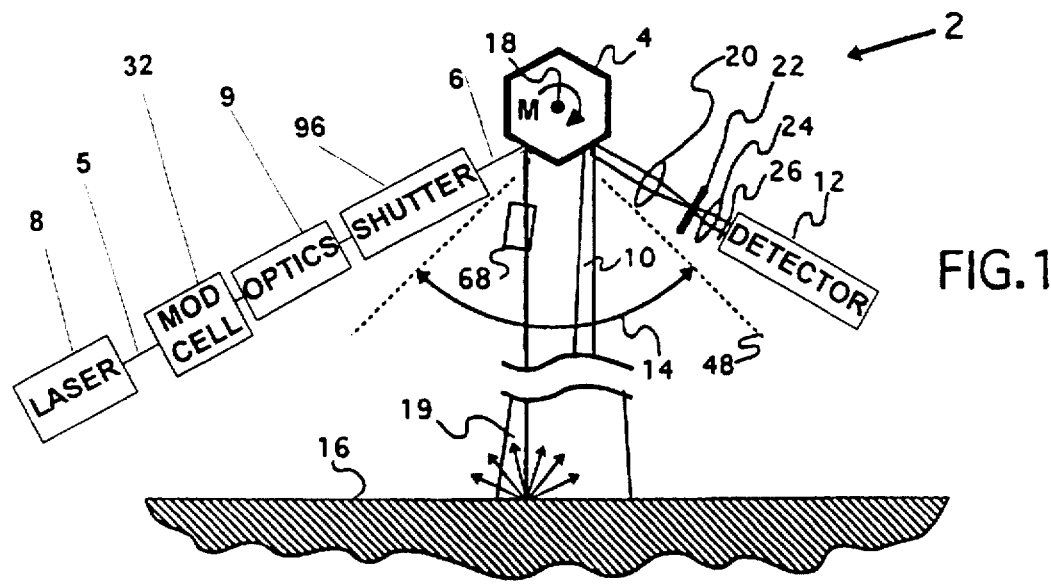
FIG. 1
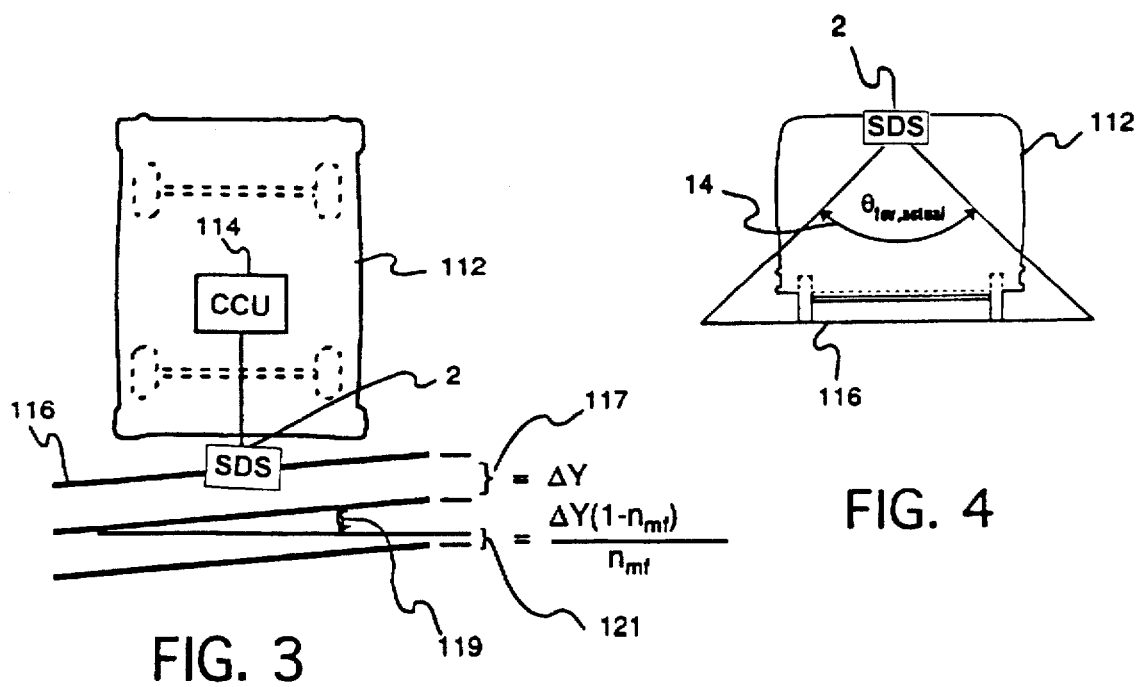
FIG. 3
FIG. 4

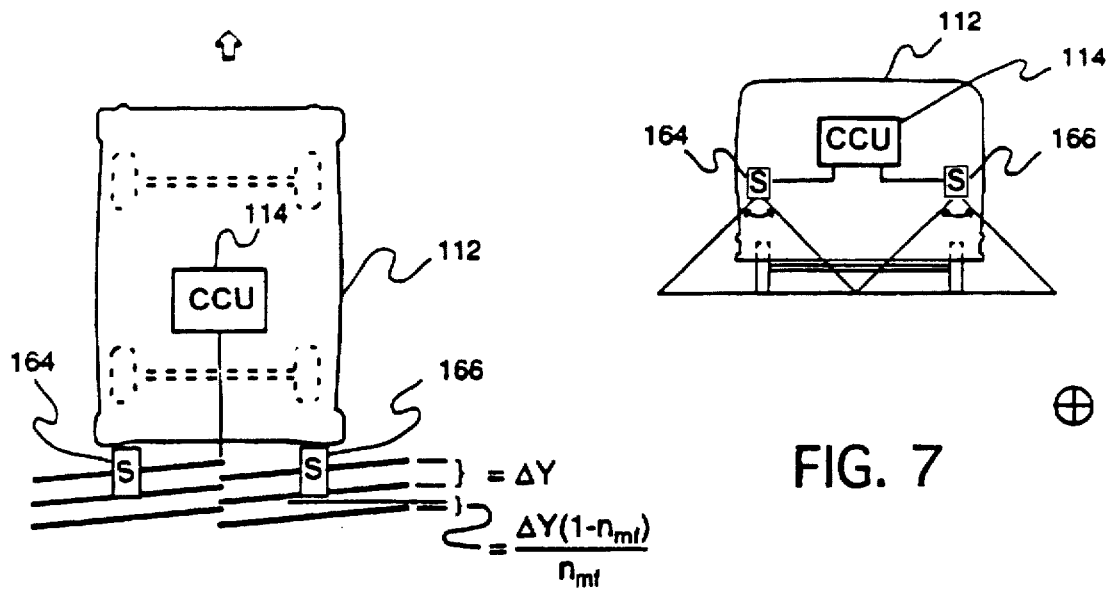
FIG. 6
FIG. 7
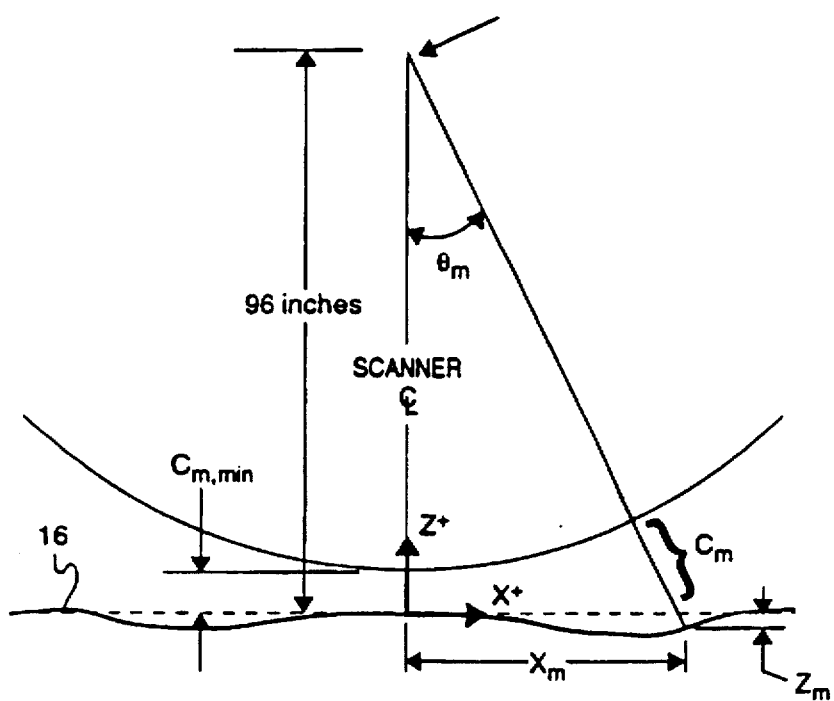
FIG. 5

HIGHWAY PROFILE MEASURING SYSTEM

This application is a continuation-in-part application of Ser. No. 08/130,099, filed Sep. 30, 1993 now U.S. Pat. No. 5,510,889. This invention relates to systems for measuring profiles of surfaces and in particular to systems for measuring the profiles of highways and other very long surfaces.

BACKGROUND OF THE INVENTION

It is important to assess the quality of newly constructed pavements and existing pavements. Quality issues include grade and roughness, crossfall and rutting, and cracking, spalling and faulting, and strength. The assessment of these quality issues typically involve pavement profile measurement. Manual methods of measuring profiles include typical surveying techniques, the Static Level Method as described in ASTM Standard Test Method E 1364-90 and the use of a Dip Stick as described in U.S. Pat. No. 4,473,960. Rutting and crossfall have been measured from vehicles with three to twelve single point acoustic or triangulation optical elevation sensors mounted along a transverse beam. An example of such a device is Highway Products ARAN system. Roughness is measured at walking speeds with devices called profilographs which use a contact sensing wheel per ASTM Standard Test Method E 1274-88 and at highway speeds with inertial profilometers as described in U.S. Pat. No. 4,741,207 and reference beam profilometers as described in UK TRRL Report 922. Surface deterioration has been determined by visual inspections and by photography and video taping. Strength is generally derived from deflection under a falling weight load using methods such as that described in ASTM Standard Test Method D 4964-87.

Efforts to measure deflection under a rolling wheel load include the use of dual transverse beams with elevation sensors such as described in U.S. Pat. No. 4,781,058 and an extension of the TRRL beam as in U.S. Pat. No. 4,571,695.

One effort at profile measurement has employed a rotating polygon and a modulated laser beam to illuminate and measure pavement cracking is described in U.S. Pat. No. 4,796,998. The only effort known to Applicant to attempt to apply rotating polygon scanning with amplitude modulation and phase measurement for transverse profiling is described in SHRP-IDEA Project 006 Report. The method there described utilized a balanced mixer as a phase detector.

Techniques for determining the profiles of surfaces by measuring the round trip time for a laser beam to travel to the surface and back is known. One such system is described by Cameron in U.S. Pat. No. 5,006,721. In U.S. Pat. No. 4,569,078, David Zuk describes a sensor using this concept to obtain an "image" of the surface of a target.

All of the above devices for measuring quality of pavement surfaces either collect the data at low highway speeds or do not provide enough detail for complete evaluation of the surface. What is needed is a device to provide detailed description of the profile of a pavement surface at speeds of as high as 50 miles per hour or higher.

SUMMARY OF THE INVENTION

The present invention provides a system for measuring the quality of pavement surfaces. An amplitude modulated laser scanning system, mounted on a motor vehicle, scans the pavement surface as the motor vehicle travels over it. A detector detects the laser beam reflection from the surface and a phase measuring device measures time between waveforms to digitally determine the phase shift in the reflected laser beam in order to calculate the profile of the surface. The profile information is used to determine various quality features of the pavement surface.

BRIEF DESCRIPTION OF THE DRAWINGS

FIG. 1 is a schematic drawing showing the principal elements of a preferred embodiment of the present invention.

FIG. 3 shows typical scans by the above embodiment.

FIG. 4 shows a rear view of a truck with the above embodiment in place.

FIG. 5 shows how polar phase information is transformed to profile information with Cartesian coordinates.

FIG. 6 shows an embodiment for measuring distress.

FIG. 7 is another view of the embodiment in FIG. 6.

DETAILED DESCRIPTION OF PREFERRED EMBODIMENTS

First Preferred Embodiment

Principal Elements

A preferred embodiment of the present invention for obtaining a profile of a section of pavement can be described by reference to FIGS. 1 through 4.

Figure 2:
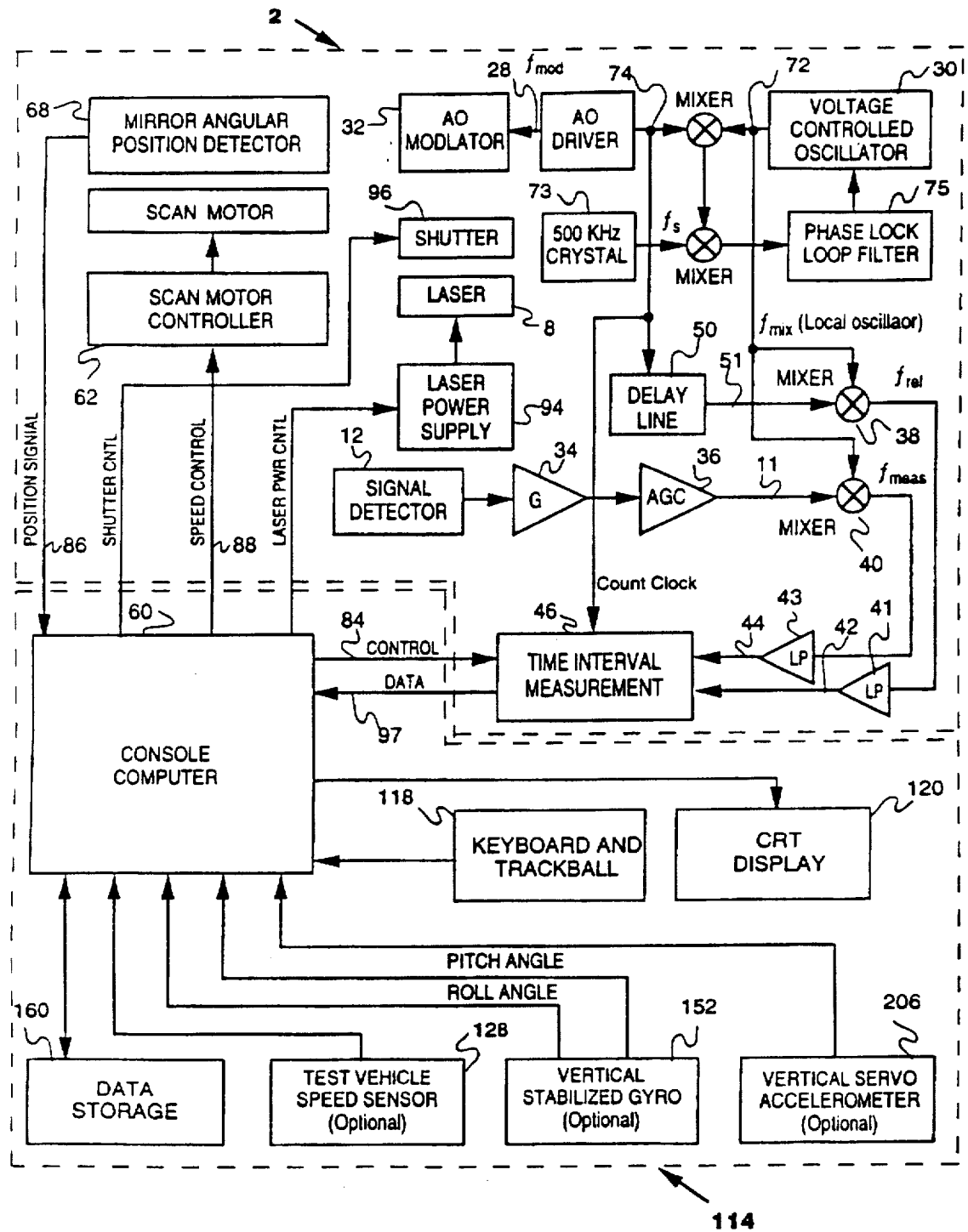
FIG. 2 is a block diagram showing some of the same elements as in FIG. 1.

A scanning distance sensor 2 as shown in FIGS. 3 and 4 is mounted on truck 112 at a distance of about 8 feet above the road surface 116. Some of the components of sensor 2 are shown in FIG. 1 and FIG. 2 is a block diagram of the system. The principal components of sensor 2 are laser 8, modulator cell 32, rotating hexagonal mirror 4, and detector 12, time measurement module 46 and computer control unit 60. Laser 8 produces a laser beam 5 which is modulated by modulator cell 32 and is directed at a lower facet of scanning mirror 4 at an angle of 60 degrees with the road surface. Detector 12 is positioned such that the axis of its field of view is directed at the adjacent lower facet of scanning mirror 4 also at an angle of 60 degrees with the road surface all as shown in FIG. 1. Time measurement module 46 determines the time delay in the laser beam signal 44 reflected from the road surface as compared to a reference signal 42. Console computer 60 calculates the pavement profile from the time interval data 97.

Laser

Laser 8 is a diode pumped Nd:Yag laser model Number 42511 available from ADLAS Inc. This laser provides a 400 mW continuous wave 532 nm beam 5 with a beam diameter of 0.32 mm and a total divergence of about 2.2 mrad. The laser beam 5 passes through and is modulated at 124 MHz by an acousto-optic modulation cell 32. A preferred modulation cell is a Brimrose Model TESW-6.2-1.0 acoustic-optic modulator driven by Brimrose driver FFA-62-F1-X with internal RF oscillator supplied by Brimrose Corporation with offices in Baltimore, Md. Laser projection optics 9 focuses laser beam 5 to a spot at a distance of 16 feet from scanner 4.

Scanner

Scanner 4 is a hexagonal scanning mirror controlled to rotate at 1,467 RPM which results in 146.7 scans per second. This scan rate permits the acquisition of each scan with insignificant distortion from movement of the scanner due to bouncing over rough pavement. With the rotational axis of the mirror parallel to the direction of travel, the scans are nearly transverse across the roadway. At 50 mph scans are separated by 6 inches 117 and are at an angle 119 of 1.8 degrees from a line transverse to the direction of travel. At 10 mph scans are separated by 1.2 inches and are at an angle of 0.4 degrees. A suitable scanner is Lincoln Laser Company (offices in Phoenix Ariz.) Model S-225-DC10-XLOB6.5 assembly with a Model PO-06-450-125 mirror and BEI (offices in Goleta, Ga.) Model MX21-2-3/8-200 encoder controlled by an ELTROL (Offices in Canoga Park, Calif.) controller board Model 5-124-024-125.

The hexagonal mirror 4 will scan the modulated laser beam 6 through 120 degrees scan angle centered about the vertical, however to have sufficient mirror area to collect reflected light, data collection is limited to scan angles from −45 degrees to +45 degrees about the vertical, which at eight foot height produces 16-foot wide scans. This unused 30 degrees of scan between each 120 degree scan means that the longitudinal separation between the end of one scan and the start of the next scan 121 is 25% of the separation between scans. For example 121 is 1.5 inches when 117 is 6 inches. A polygon position detector assembly 68 consisting of light emitting diode aligned with a photodiode mounted behind a small aperture provides a pulse output at the start of each scan. The position detector is positioned at 7.5 degrees from the vertical on the output facet and therefore is normal to the surface of the output facet of scanning mirror 4 when the scan angle is −45 degrees; i.e. the start of the scan.

Detector

Detector 12 is a silicon avalanche photodiode such as the New Focus Inc. Model 1651 Si-APD. This detector has a band width form 100 KHz to 1 GHz and is well suited to detect the road surface reflected 532 nm light from the laser 8 modulated at 124 MHz. Light scattered by the pavement is reflected from mirror 4 into collection optics 20 through slit aperture 22 and delivered by optics 24 onto light detector 12. Slit aperture 22 limits the detector FOV in the dimension perpendicular to the scanning plane to reduce detection of ambient light scattered from the area surrounding the spot on the pavement illuminated by the modulated laser beam 6.

Phase Data Acquisition

As shown in FIG. 2, the output from detector 12 is amplified by an active low noise amplifier 34 such as in the New Focus Model 1651 detector which has an integral gain of 24 db. and then by automatic gain amplifier 36 to produce a signal 11 of about 0.5 volt rms.

The acousto-optic modulator driver provides a reference signal 74 at the modulation frequency which is utilized to provide the reference signal. Signal 74 is the same signal which was used to modulate laser beam 5 to produce the modulated laser beam 6 detected by detector 12. Signal 74 is routed through delay line 50 to impose a delay of about 15 nano seconds which corresponds to a light traveled distance of about 15 feet. The round trip distance to just above the pavement at the nearest point is 8 feet. To do this we use coaxial cable about 10 feet long; the precise length is easily determined by trial and error. Signal 51 is in the range of 0.5 volts and the frequency of this delayed reference signal is 124 MHz.

Both the delayed reference signal 51 and the conditioned measurement signal 11 are shifted to 500 KHz for sampling the relative phase by mixing both signals with a local oscillator signal 72 at 123.500 MHz in double balance mixers (Mini-Circuits Model ZAD-1SH) 38 and 40 respectively, as shown in FIG. 2. The local oscillator signal 72 is generated from a 500 KHz crystal oscillator 73 with a conventional phase lock loop. The mixer outputs pass through low pass filters 41 and 43 respectively to pass only the difference frequency signals at 500 KHz. The phase relationship between the reference and the measurement signals at the modulation frequency is preserved by the mixing process. Sampling at 500 MHz limits the change in distance to the pavement during each sample to a maximum of 0.10 inch which occurs at the edges of the scan.

Phase Shift Determination

Phase shift between the measurement and reference is determined by the measuring the time intervals from the positive-going zero crossing of the reference signal 42 to the next positive-going zero crossings of the measured signal 44 and also the next positive-going zero crossings of the reference signal itself 42. Then using these time intervals, the delay time and reference period respectively, the ratio of the delay time to the reference period is formed. The result is the fraction of one cycle of phase change. As an example, with our modulation frequency of 124 MHz (i.e. a wavelength of 95.04 inches) and with both signals heterodyned down to 500 MHz, we let these two signals operate a counting gate and the counted pulses are formed from the modulation frequency reference 74 direct, i.e. a pulse frequency of 124 MHz. That is to say, there would be 248 pulses in a $2\pi$ radians phase difference at 500 MHz—which itself is equal to 95.04 inches of double path length. Hence one pulse counted would be equivalent to about 0.38 inch of round-trip range or 0.19 inch radial distance in the direction of the laser beam.

Computer Controller

Time measurement module 46 is controlled by console computer 60 which in this embodiment is a Nu-Bus Macintosh computer with an MXI interface card and a cable connection to a VXI extender provided by National Instruments P/N 77631-01 installed in a 6 slot VXI Chassis by Racal Dana, Model No. 1264U.

At the start of each test sequence, the operator identifies the test to be performed by typing the details including route number, lane number, direction, start position and other relevant information. Console computer 60 writes this information in a start header on an AMPEX DST 600 19 mm tape drive 160 in accordance with software which is easily created using instructions provided in the manuals available for use with the tape drive 160. The operator signals that the truck is passing the start of the test route by typing a designated key on the keyboard, computer 60 begins recording data on tape drive 160.

Phase Calculation

During each scan, 2,557 samples of phase are made by the time measurement module 46 at 500 MHz beginning at a scan angle of −45 degrees and ending at +45 degrees. When one scan is complete, the computer reads the data 97 representing the scan over the MXI interface, and attaches a time tag and transfers the block of data over a SCSI-2 interface to the write buffer of the magnetic tape 160. The identified equipment has a sustained transfer rate capability of 15 MBytes/sec so that the data for one scan can be transferred in the 0.0017 second interval between the completion of one scan and the start of the next scan. After the data is transferred module 46 is made ready for the next scan. Tapes are available having a capacity of 165 Giga bytes so that 32.3 million scans can be stored on one tape. This number of scans corresponds to about 3,055 miles of data which could be recorded using the procedure described above with a 6 inch scan spacing taken at 50 mph. With the truck moving at fast walking speed (i.e., 4 mph), the spacing in the forward direction would be 0.48 inch and about 245 miles of data could be collected on one tape. Computer 60 is preferably programmed so that as the operator observes the truck passing position landmarks (commonly referred to as mile posts) and reference signals can be interposed by the computer when the operator signifies the event with an appropriate key on the computer keyboard or the mouse.

Preparation of Road Profile

As indicated above the following data will be accumulated by computer 60 on magnetic tape storage device 61 for each scan:

time/date stamp and
2557 phase measurements.

At 50 mph, data for 2640 scans are recorded for each mile. For example, for a 5 mile section of highway, 13200 sets of scan data will be recorded. After the data is accumulated, it is processed in computer 60 to produce the profile of the section of highway examined.

The data for each scan is transformed to Cartesian coordinates and normalized to the pavement surface at the centerline of the scan by the following (FIG. 5 illustrates these variables):

$$X_m = [(C_m/2 - C_{m,min}/2) 0.19 \text{ in/count} + 96 \text{ in}] \cos\theta_m - 96 \text{ in}$$

$$Z_m = [(C_m/2 - C_{m,min}/2) 0.19 \text{ in/count} + 96 \text{ in}] \sin\theta_m$$

where:

$C_{m,min}$ is the count at the center of the scan $C_m$ is the count at angle $\theta_m$ $Z_m$ is the normalized pavement height in inches $X_m$ is the transverse position in inches of the respective pavement height $Z_m$ from the scan centerline A reasonable estimate of Xm may be precalculated, stored and obtained from a look up table by assuming a flat pavement.

5-Mile Profile

A profile of the 5-mile long, 16-foot wide section of highway is then developed by computer manipulation. The result is an array of profile data at 6-inch intervals in the forward direction and at radial intervals about 0.00682 degrees (0.74 mrad) in a direction very close to the transverse direction. In this close to the transverse direction, the spacing is about 0.071 inch directly under the scanner and the spacing increases to about 0.141 at the maximum scan angle.

Spot Size

Each data point is representative of a the average vertical height of a small spot on the pavement surface. These spots are the "footprint" of the laser beam as it scans across the pavement surface and is detected by detector 12. The laser spot is circular under the scanner and becomes oval shaped at the ends of the scan. The laser beam is about 0.012 inches as it departs the optics 9 and is focused to minimize divergence. The maximum smearing of the spot in the transverse direction occurs at the edges of the scan and increases the spot width by about 41%. Smearing in the forward direction increases with speed and is a maximum of less than 0.002 inches at 50 mph. Therefore, the size of the spot is in the range ⅛ inch to about ¼ inch.

Display and Analysis

This array of data can be displayed in a variety of methods using standard computer graphic methods. For example, the data can be converted to a gray scale depending on the height of each data point. Or it can be displayed as a color map of the surface of the roadway.

The data can also be converted to 192 evenly spaced values by interpolating between the data points. Further, the data is available for a multitude of other types of analysis of interest to highway engineers and inspectors. And it can be easily saved for historical purposes.

Variations for Phase Measurements

In applications where better profile resolution is required, the following alternative embodiments are recommended:

For example, to measure profile to 0.01 inch resolution the measurement interval 47.628 inches must be resolved to 0.01 inches which is 1 part in 4,763. This requires measuring one phase cycle of 360 degrees to 1 part in 4,763 which is 0.0756 degrees. The measurement is being made after mixing the modulation frequency to 500 MHz. Thus, measuring phase resolution of 0.0756 degrees by time interval requires resolving one period at 500 MHz which is 2,000 nsec into 1 part in 4763 or 0.42 nsec. Using the standard method of counting pulses, to resolve 0.42 nsec would require a clock frequency of 2.38 GHz. The Racal Dana 2351 Time Interval Analyzer is well suited for this application. The 2351 makes an initial estimate by counting pulses in the usual manner with a 250 MHz clock and then refines this estimate by measuring the time between each zero crossing of interest and the following 250 MHz clock pulse by charging a capacitor during this interval and then measuring the time to discharge the capacitor at a slower rate. Using this method the 2351 in able to resolve time to 0.2 nsec which is 2X better than required for 0.1 inch resolution.

A digital logic circuit which provides the basic pulse counting function is described in U.S. Pat. No. 4,569,078. Another digital method of phase measurement involves sampling the measurement waveform in phase with the reference waveform and computing the phase angle from the Fourier coefficients computed from the sampled waveform as shown by Payne in Rev. Sci. Instrum. 63(6) June 92. These digital methods of phase measurement are improved over mixer type detectors. They provide for direct measurement of phase shift without the need for calibration corrections for changes in the amplitudes of the reference and measurement signals, as is required for mixer type phase detectors which eliminates the requirement for complex calibration calculations.

Another approach to increasing resolution is by increasing the modulation frequency. For example modulating at 1.24 GHz will result in a 10x improvement in resolution over 124 MHz for the same timing resolution. It is then generally simple to reconstruct the profile measured at 1.24 GHz when the distance measured repeats 10 times as the phase goes through 10 cycles when the distance changes during scanning, because the pavement is relatively smooth compared to the half-wavelength at 1.24 Ghz, which is 4.76 inches.

Other Embodiments

Variable Speed System

The scanner 4 specified above is a variable speed scanner and its speed of rotation can be controlled by computer controller 60. Therefore, a second preferred embodiment of the present invention is a variable system wherein a truck speed signal is fed into computer controller. The signal can be provided from a precision odometer 128 in FIG. 2 or form a calibrated pickoff from the trucks anti-slip breaking system. Based on the truck speed, computer 60 instructs scanner 4 to speed up or slow down as necessary to maintain a constant scan increment in the forward direction. Otherwise, the system operates essentially the same as specified above. In this case the count data will not be regular; i.e. there will be a greater amount of data per scan at slower speeds than at faster speeds so that interpolation will be necessary to obtain consistent data points in the transverse direction.

Roll Correction

In another preferred embodiment roll correction is provided. As shown in FIG. 2, Computer 60 determines the roll angle of the truck by reading the analog voltage from a potentiometer attached to the roll gimbal of a vertically stabilized gyro 152 which is preferably a Humpheries Model No. VG 24-3109-2. Another suitable sensor would be the solid state angular rate gyros which do not require erection as do the rotating mass gyros. This information is sampled once per scan and stored after each scan and subsequently when the profile is calculated correction can be made for the roll of the truck, when the data is converted to Cartesian coordinates as follows:

$$X_m=[(C_m/2-C_{m,min}/2)0.19 \text{ in/count}+96 \text{ in}]\text{Cos}(\theta_m-\theta_{roll})-96 \text{ in}$$

$$Z_m=[(C_m/2-C_{m,min}/2)0.19 \text{ in/count}+96 \text{ in}]\text{Sin}(\theta_m-\theta_{roll})$$

Lateral acceleration can be measured and used to correct the roll measurement for the influence of vehicle turning acceleration on the roll measurement, as a basic practice in strapdown inertial navigation and as is taught by Swindall (U.S. Pat. No. 4,674,327 which is incorporated herein by reference).

With the profiles referenced to the gravity force vector (i.e. a direction parallel to the local gravitational field), the average crossfall angle may be calculated and related information such as the efficiency of rain water runoff can be determined. Collection of a transverse profile by scanning and referencing it to the gravity force vector is an improvement over all prior art transverse scanning techniques which provide a profile from a fixed reference system such as train rails.

This embodiment provides the transverse profile without the need for a rigid transverse bar with a multitude of elevation sensors as in current systems. This embodiment further provides the transverse profile beyond the lateral extents of the vehicle, without the need for an overhanging bar as in current systems. And it can scan out into the shoulder area providing important information uses by maintenance personnel, such as the requirement for grading and debris removal.

Two-Dimensional Profile Map Generation

A preferred embodiment of the present invention as shown in FIG. 2, computer 60 measures the input and integrates the input from a Sunsrand inertial grade servotype accelerometer 206 with the sensitive axis vertical and relates successive profiles to the profile at the start of the integration just as single inertial longitudinal profiles are produced as in U.S. Pat. No. 4,741,207. This processing when applied to transverse profiles corrected for roll angle generates the true topology of the pavement over the entire lane. Roughness and grade along all longitudinal lines is available. The two-dimensional profile map so generated is reconstruction of the surface profile relative to the inertial starting elevation. Generation of such a profile map enables the pavement engineer to study the full range of effects caused by changes in the pavement surface topology. This is a fundamental improvement over prior art traverse scanning systems which operate from fixed reference surfaces such as the plane defined by train rails for train or tunnel clearance profiling.

An alternative embodiment for connecting successive traverse profiles at the correct elevation is to concurrently scan longitudinally with a second scanner, such as in FIGS. 8 and 9 and use the specifically measured longitudinal profile referenced to gravity as explained below to relate successive transverse scans. This method eliminates the potential error from integration of the accelerometer.

Measuring Distress (Cracks, etc.)

A third preferred embodiment of the present invention is shown in FIGS. 6 and 7. Here two scanners 164 and 166 are used and they are located 3 feet above the road surface in order to provide more accurate profiles at the higher scan rates required to obtain more closely spaced scans at 50 mph as required to find the smallest cracks of interest. The data collection is essentially the same as above except it is more thorough and more closely spaced.

Longitudinal Profiling

Figure 8:
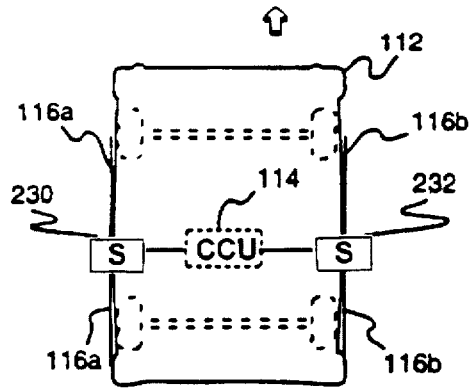
FIG. 8 shows an embodiment for measuring longitudinal profile.
Figure 9:
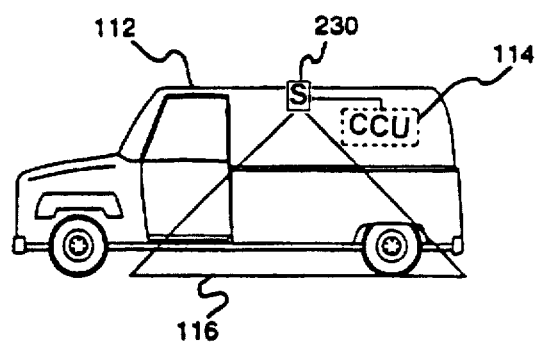
FIG. 9 is another view of the embodiment in FIG. 8.

A preferred embodiment for making longitudinal profiles is shown in FIGS. 8 and 9. Scanners 230 and 232 may be located on either of both sides of the truck. By proper setting of the rotation speed of the scanners for specific forward truck speed, each new scan 116 will cover for example 6 inches of previously unscanned pavement while overlapping within 138 inches of previously scanned pavement. By transforming the new scan to longitudinally align with the previous scans, the 6 inches of new profile may be added to the previous scan. By repeating this process of continuous longitudinal profile may be constructed without the integration of an accelerometer output as per U.S. Pat. No. 4,741, 207.

The longitudinal profile may be transformed to be referenced to gravity and used for grade determination and related analyses, as shown in FIG. 2 by measuring the pitch angle from a vertically stabilized gyro 152 and using that information during the transformation of the profile to Cartesian coordinates as follows:

$$X_m=[(C_m/2-C_{m,min}/2)0.19 \text{ in/count}+96 \text{ in}]\text{Cos}(\theta_m-\theta_{pitch}) - 96 \text{ in}$$

$$Z_m=[(C_m/2-C_{m,min}/2)0.19 \text{ in/count}+96 \text{ in}]\text{Sin}(\theta_m-\theta_{pitch})$$

Deflect ion with Two Scanners

Figure 10:
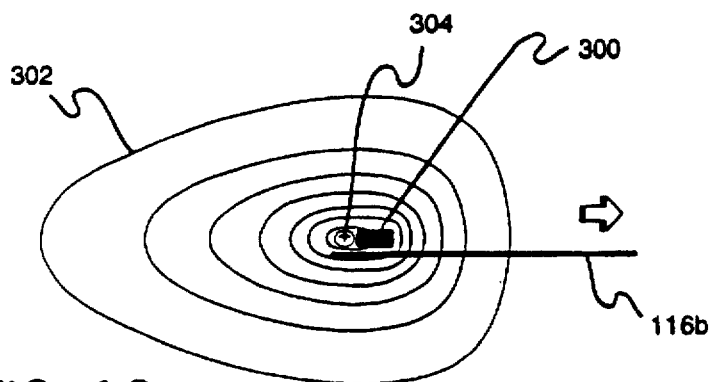
FIG. 10 shows pavement deflection caused by a rolling wheel.
Figure 11:
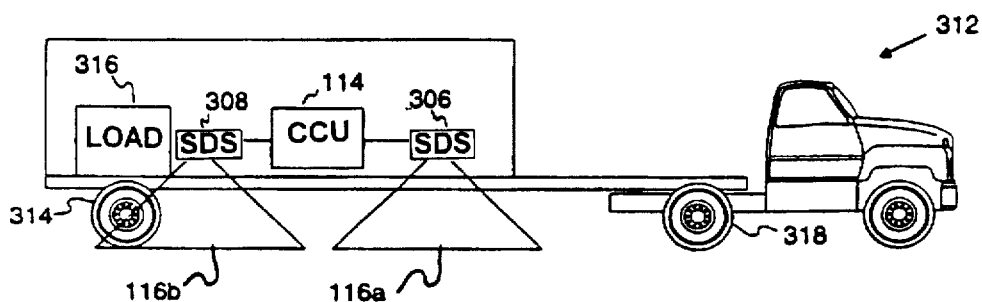
FIG. 11 shows a first embodiment for measuring deflection.

A preferred embodiment for measuring deflection under a rolling wheel load is shown in FIG. 11. Shown in FIG. 10 is a plan view with topography lines 302 of pavement undergoing deflection caused by the load 316 impressed through the footprint 300 of a rolling wheel 314. This deflection contrasts in shape to the circular concentric basin caused by the failing weight deflectometer. The peak deflection 304 under a rolling wheel load can occur after the wheel has passed. As shown in FIG. 11, the system has two scanners, the forward scanner 306 measures the undeflected longitudinal profile and 308 measures the deflected profile 305 adjacent to a rolling wheel 314 in line with the profile measured by 306.

The deflected profile which is 12 feet long is positioned to cover 1 foot aft of the wheel foot print to measure as close as possible to the peak deflection and forward to measure the leading face of the deflection basin. The deflection basin can be determined by processing undeflected and deflected scans that overlap. After converting each scan to Cartesian coordinates as described in the first embodiment, the deflected scan is transformed so that the leading 4 feet which will generally be beyond the deflection basin, is aligned statistically with the same part of the undeflected scan. Then the deflection basin is determined by subtracting the undeflected scan from the deflected scan. This processing eliminates the need to try to position a second sensor precisely in time and space to measure the precise same point as was measured by the first sensor or to measure and correct for the bouncing motion between the scan by 306 of a given profile and the scan by 308 of the same profile, and removes inherent topography such as cracks and faults from the computed deflection basin. This method provides closely spaced rolling wheel deflection basin data continuously without stopping traffic.

To those experienced in the art it will be apparent that the deflected scan from 308 can also be processed to determine transverse joint load transfer efficiency. Also the longitudinal profile can be determined as described above from the undeflected scan from 306.

Deflection with One Scanner

Figure 12:
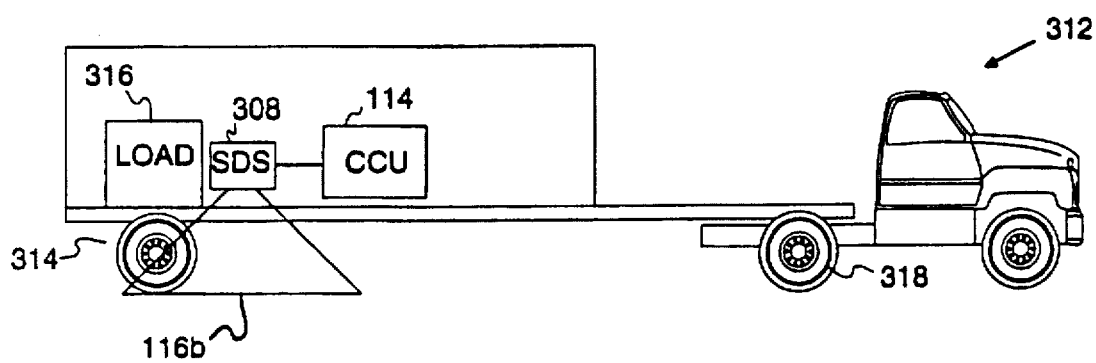
FIG. 12 shows a second embodiment for measuring deflection.

Another preferred embodiment for measuring deflection under a rolling wheel is shown in FIG. 12. Shown in FIG. 10 is a plan view with topography lines 302 of pavement undergoing deflection caused by the load 316 impressed through the footprint 300 of a rolling wheel 314. This deflection contrasts in shape to the circular concentric basin caused by the falling weight deflectometer. The peak deflection 304 under a rolling wheel load can occur after the wheel has passed. As shown in FIG. 12, the system has one scanner positioned to measure the profile illustrated in FIG. 10. With a total scan length of 14 feet, at least 3 feet is outside the influence of deflection basin, in the direction the truck is traveling. As is described above for determination of longitudinal profile, the undeflected segment of successive scans can be pieced together in processing to generate a continuous profile. This continuous profile can be used then to process the profile from this single scanner so positioned to calculate the deflection profile, as described above for Deflection with Two Scanners.

While the above description contains many specificities, the reader should not construe these as limitations on the scope of the invention, but merely as exemplifications of preferred embodiments thereof. Those skilled in the art will envision many other possible variations are within its scope. For example, the data stored after a trip across a section of highway will be in digital form and it is possible for the computer to calculate almost the exact position of each data point. The computer can be programed by persons skilled in the art to present the data in many dozen forms. For example, it can be programed to present a memo giving the exact location and dimension of of every pot hole on the route and if desired, issue a work order to a crew to fix them. Instead of an A/O modulator external to a CW laser, one can directly modulate the current to a high power laser diode such as the SDL Inc 2380C. Accordingly the reader is requested to determine the scope of the invention by the appended claims and their legal equivalents and not by the examples which have been given.

I claim:

1. A highway profile measuring system for measuring the profiles of large surfaces comprising:
    A) a vehicle defining a forward direction and a transverse direction
    B) a laser means mounted on said motor vehicle for producing a laser beam for illuminating small spots on said large surfaces,
    C) a first detector means for detecting reflections of portions of said laser beam from said large surface,
    D) a first scanner means having a fixed or adjustable scan rate for scanning said laser beam on said large surfaces and reflecting portions of said beam reflected from said surfaces into said detector means,
    E) a modulating means for modulating said laser beam with a predetermined frequency of less than 10 GHz,
    F) a phase measuring means for digitally determining the phase shift of said portion of said modulated beam reflected into said detector means from a very large number of said small spots on said surfaces.

2. A system as in claim 1 wherein said first scanner means is mounted on said motor vehicle and arranged to scan in a direction essentially parallel to said transverse direction.

3. A system as in claim 1 and further comprising a computer means for calculating data points describing the profile of at least a large portion of the surface scanned by said scanner.

4. A system as in claim 1 wherein said vehicle is predetermined to operate at varying speeds and the scan rate of said scanner is controlled to correspond to the speed of said motor vehicle.

5. A system as in claim 1 and further comprising a roll angle measuring means for determining the roll angle relative to gravitation force vectors and a means for correlating phase shift measurements with gravitation force vector measurements in order to provide a surface profile relative to the gravitation force vector.

6. A system as in claim 5 wherein said first scanner means is mounted on the rear of said motor vehicle and arranged to scan in a direction essentially parallel to said transverse direction.

7. A system as in claim 5 and further comprising a computer means for calculating data points to provide said surface profile.

8. A system as in claim 5 wherein said vehicle is predetermined to operate at varying speeds and the scan rate of said scanner is controlled to correspond to the speed of said motor vehicle.

9. A highway profile measuring system for installation on a vehicle for measuring the profiles of large surfaces comprising:
    A) a laser means mounted on said motor vehicle for producing a laser beam for illuminating small spots on said large surfaces,
    B) a first detector means for detecting reflections of portions of said laser beam from said large surface,
    C) a first scanner means having a fixed or adjustable scan rate for scanning said laser beam on said large surfaces and reflecting portions of said beam reflected from said surfaces into said detector means,
    D) a modulating means for modulating said laser beam with a predetermined frequency of less than 10 GHz,
    E) a phase measuring means for digitally determining the phase shift of said portion of said modulated beam reflected into said detector means from a very large number of said small spots on said surfaces.

10. A highway profile measuring system for measuring the profiles of large surfaces comprising:
    A) a vehicle defining a forward direction and a transverse direction
    B) a laser means mounted on said motor vehicle for producing a laser beam for illuminating small spots on said large surfaces,
    C) a first detector means for detecting reflections of portions of said laser beam from said large surface,
    D) a first scanner means having a fixed or adjustable scan rate for scanning said laser beam on said large surfaces and reflecting portions of said beam reflected from said surfaces into said detector means, said scanner being arranged to scan in a direction parallel to said forward direction and scan both forward and rearward of at least one wheel of said vehicle, E) a modulating means for modulating said laser beam with a predetermined frequency of less than 10 GHz, F) a phase measuring means for digitally determining the phase shift of said portion of said modulated beam reflected into said detector means from a very large number of said small spots on said surfaces;

wherein deflection of a road surface is measured by comparing phase data obtained from a second set of reflections from locations near said at least one wheel with data obtained from a first set of reflections when said locations were substantially forward of said at least one wheel.

11. A highway profile system as in claim 10 wherein said at least one wheel defines a deflection zone and said first set of of reflections are obtained at a time when said locations are forward of said deflection zone.

12. A highway profile system as in claim 11 wherein said first set of of reflections are obtained at a time when said locations are forward of said deflection zone by at least three feet.

* * * * *